United States Patent
Gent

(10) Patent No.: US 10,159,174 B2
(45) Date of Patent: Dec. 25, 2018

(54) SOIL OPENER

(71) Applicant: C.S. Gent & Sons LTD, Spalding Lincolnshire (GB)

(72) Inventor: Anthony Gent, Spalding Lincolnshire (GB)

(73) Assignee: C.S. Gent & Sons LTD, Spalding Lincolnshire (GB)

( * ) Notice: Subject to any disclaimer, the term of this patent is extended or adjusted under 35 U.S.C. 154(b) by 242 days.

(21) Appl. No.: 15/029,932

(22) PCT Filed: Nov. 11, 2014

(86) PCT No.: PCT/GB2014/053341
§ 371 (c)(1),
(2) Date: Apr. 15, 2016

(87) PCT Pub. No.: WO2015/071652
PCT Pub. Date: May 21, 2015

(65) Prior Publication Data
US 2016/0234995 A1   Aug. 18, 2016

(30) Foreign Application Priority Data

Nov. 12, 2013 (GB) .................................. 1319935.1
Mar. 24, 2014 (GB) .................................. 1405202.1

(51) Int. Cl.
*A01C 5/06* (2006.01)
*A01C 7/20* (2006.01)
(Continued)

(52) U.S. Cl.
CPC ................ *A01C 5/064* (2013.01); *A01B 5/04* (2013.01); *A01B 35/18* (2013.01); *A01B 49/027* (2013.01); *A01C 5/06* (2013.01); *A01C 7/201* (2013.01)

(58) Field of Classification Search
CPC .......... A01C 7/006; A01C 7/06; A01C 7/201; A01C 5/06; A01C 5/064; A01B 35/18;
(Continued)

(56) References Cited

U.S. PATENT DOCUMENTS 526,436 A * 9/1894 Campbell ................ A01C 7/18
111/165
605,348 A * 6/1898 Schultz .................. A01C 5/064
111/164
(Continued)

FOREIGN PATENT DOCUMENTS

CA       2326204 A1    5/2002
CN       1081310 A     2/1994
(Continued)

OTHER PUBLICATIONS

Ashworth et al., Disc Seeding in Zero-Till Farming Systems—A Review of Technology and Paddock Issues, Western Australian No-Tillage Farmer Association (WANTFA), Aug. 2010. ISBN: 978-0-646-52876-2, p. 50.
(Continued)

*Primary Examiner* — Jessica H Lutz
(74) *Attorney, Agent, or Firm* — TraskBritt

(57) ABSTRACT

A soil opener comprises first and second soil-cutting members. The first member has a first soil-engaging surface inclined at a first angle perpendicular to the soil surface when viewed along a travel direction, the first angle being greater than zero, and at a second angle to the travel direction when viewed along a perpendicular, the second angle being greater than zero. The second member comprises a rotating disc and has a second soil-engaging surface that faces away from, and in a substantially opposite direction to, the first soil-engaging surface, the second soil-engaging surface being inclined at a third angle perpendicular when viewed along the travel direction, the third angle (Continued)

being greater than zero and in the same sense as the first angle.

27 Claims, 15 Drawing Sheets

(51) Int. Cl.
*A01B 5/04* (2006.01)
*A01B 35/18* (2006.01)
*A01B 49/02* (2006.01)

(58) Field of Classification Search
CPC .. A01B 35/28; A01B 5/04; A01B 5/06; A01B 49/027
See application file for complete search history.

(56) References Cited

U.S. PATENT DOCUMENTS

| | | | | |
|---|---|---|---|---|
| 736,963 | A * | 8/1903 | Ham | A01C 5/06 111/165 |
| 842,066 | A * | 1/1907 | Beymer | A01B 39/14 111/141 |
| 2,691,353 | A * | 10/1954 | Secondo | A01C 5/06 111/135 |
| 2,920,587 | A * | 1/1960 | Shriver | A01C 5/064 111/135 |
| 3,115,192 | A * | 12/1963 | Bushmeyer | A01B 15/18 172/166 |
| 3,244,237 | A * | 4/1966 | Keplinger | A01B 15/16 172/574 |
| T862,011 | I4 * | 5/1969 | Koronka et al. | A01B 15/18 111/140 |
| 4,214,537 | A * | 7/1980 | Bailey | A01C 5/06 111/140 |
| 4,365,674 | A * | 12/1982 | Orthman | A01B 69/024 172/126 |
| 4,646,663 | A * | 3/1987 | Nikkel | A01C 5/064 111/73 |
| 4,781,129 | A | 11/1988 | Swanson et al. | |
| 4,825,957 | A * | 5/1989 | White | A01B 61/042 172/126 |
| 4,930,431 | A * | 6/1990 | Alexander | A01B 61/04 111/164 |
| 5,285,854 | A * | 2/1994 | Thacker | A01B 17/002 172/176 |
| 5,609,114 | A | 3/1997 | Barton | |
| 5,724,902 | A * | 3/1998 | Janelle | A01C 5/064 111/164 |
| 5,752,453 | A * | 5/1998 | Nikkel | A01C 5/064 111/121 |
| 5,802,995 | A * | 9/1998 | Baugher | A01C 5/068 111/140 |
| 5,878,821 | A * | 3/1999 | Flenker | A01B 21/086 172/569 |
| 6,067,918 | A * | 5/2000 | Kirby | A01B 35/28 111/118 |
| 6,213,035 | B1 * | 4/2001 | Harrison | A01C 5/064 111/164 |
| 6,575,104 | B2 * | 6/2003 | Brummelhuis | A01C 7/006 111/139 |
| 6,978,727 | B2 * | 12/2005 | Geddes | A01C 5/06 111/167 |
| 7,044,070 | B2 * | 5/2006 | Kaster | A01C 7/006 111/62 |
| 7,395,770 | B2 * | 7/2008 | Neudorf | A01C 5/064 111/121 |
| 7,540,246 | B2 * | 6/2009 | Friesen | A01C 5/064 111/167 |
| 7,575,066 | B2 * | 8/2009 | Bauer | A01B 5/12 172/166 |
| 7,581,503 | B2 * | 9/2009 | Martin | A01C 5/064 111/167 |
| 8,356,563 | B2 * | 1/2013 | Schaffert | A01C 5/064 111/121 |
| 9,192,091 | B2 * | 11/2015 | Bassett | A01B 49/04 |
| 9,204,590 | B2 * | 12/2015 | Schaffert | A01C 5/04 |
| 9,215,838 | B2 * | 12/2015 | Bassett | A01B 49/06 |
| 9,232,689 | B2 * | 1/2016 | Trevino | A01C 7/06 |
| 9,497,900 | B2 * | 11/2016 | Nelson | A01C 5/066 |
| 9,814,171 | B2 * | 11/2017 | Janelle | A01B 21/08 |
| 2002/0162492 | A1 * | 11/2002 | Juptner | A01C 5/064 111/140 |
| 2005/0045080 | A1 * | 3/2005 | Halford | A01C 5/062 111/118 |
| 2008/0257238 | A1 | 10/2008 | Friesen | |
| 2012/0137942 | A1 | 6/2012 | Nikkel et al. | |

FOREIGN PATENT DOCUMENTS

| | | |
|---|---|---|
| CN | 201294733 Y | 8/2009 |
| CN | 201355911 Y | 12/2009 |
| CN | 202354053 U | 8/2012 |
| CN | 202889912 U | 4/2013 |
| DE | 202013100178 U1 | 1/2013 |
| FR | 1018582 A | 1/1953 |
| FR | 2099903 A5 | 3/1972 |

OTHER PUBLICATIONS

Flexi-Coil: Industry Expert in Seeding, Tillage and Spraying Equipment, www.flexicoil.com/barton.asp, visited Oct. 14, 2013, 1 page.
Great Plains, "Harvest Starts Here", Seed, Grain Drills, Placement Catalog 1006-GPM, www.gretplainsag.com, (2016), 40 pages.
International Search Report for International Application No. PCT/GB2014/053341dated Mar. 17, 2015, 4 pages.
International Written Opinion for International Application No. PCT/GB2014/053341dated Mar. 17, 2015, 7 pages.
John Deere, 740A and 750A Drills Catalog, Nov. 11, 2008, 7 pages.
Weaving Machinery, Weaving Big Disc, Zero-Till & Min-Till Drill Catalog, www.weavingmachinery.net, (2015), 6 pages.
Australian Examination Report No. 1 for Australian Application No. 2014349904 dated Nov. 10, 2017, 7 pages.
Chinese First Office Action for Chinese Application No. 201480057549.2 dated Jan. 29, 2018, 10 pages.
Chinese First Search from Chinese Application No. 2014800575492, dated Jan. 19, 2018, 2 pages.

* cited by examiner

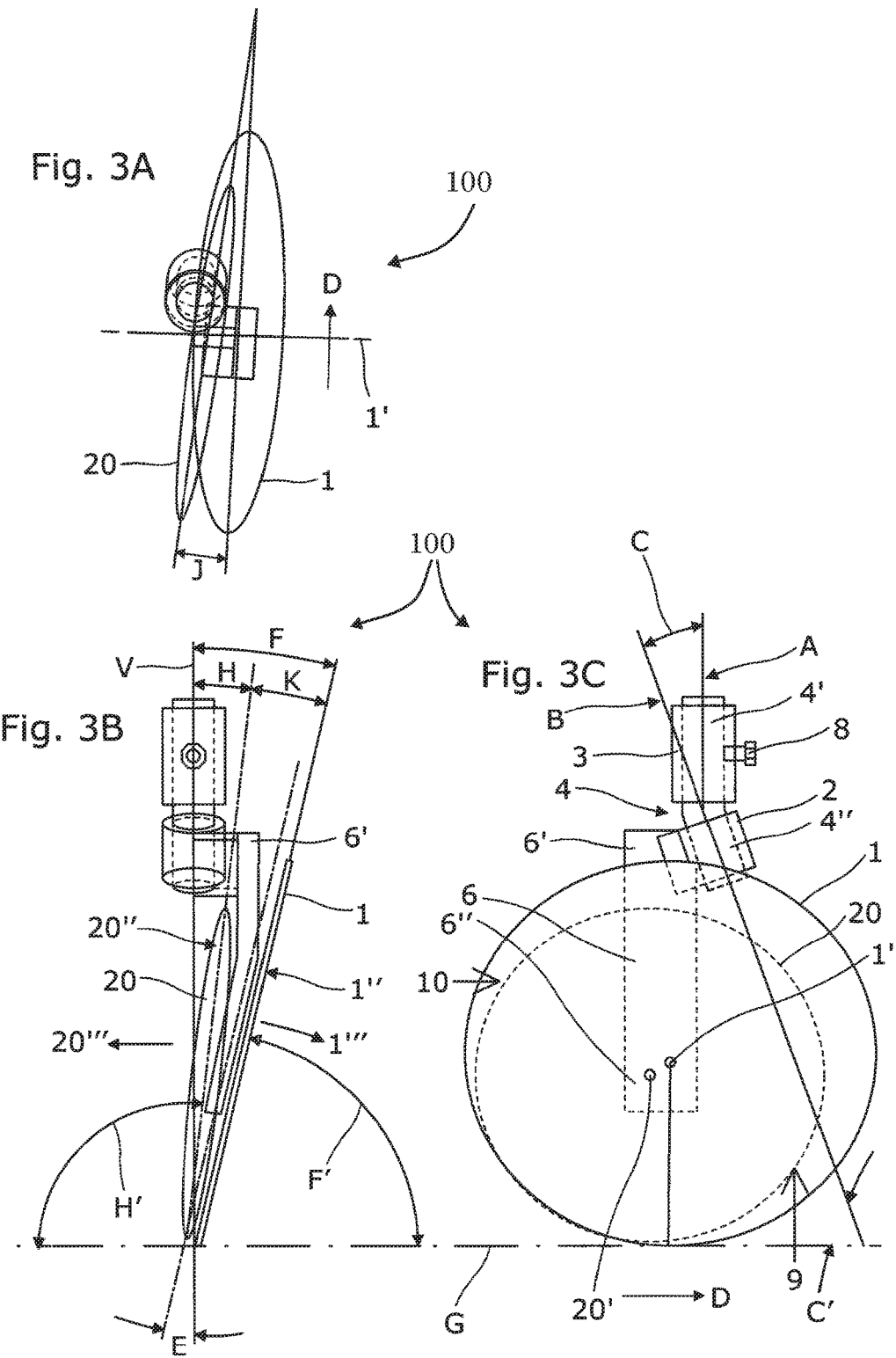

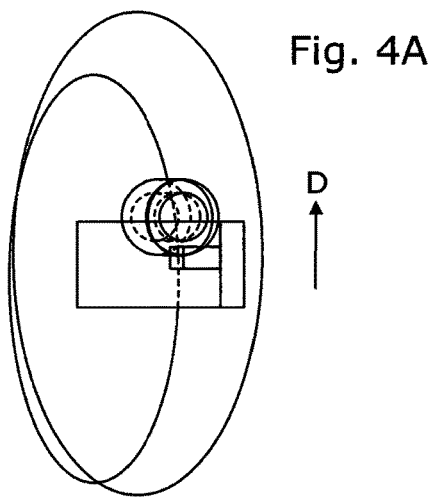
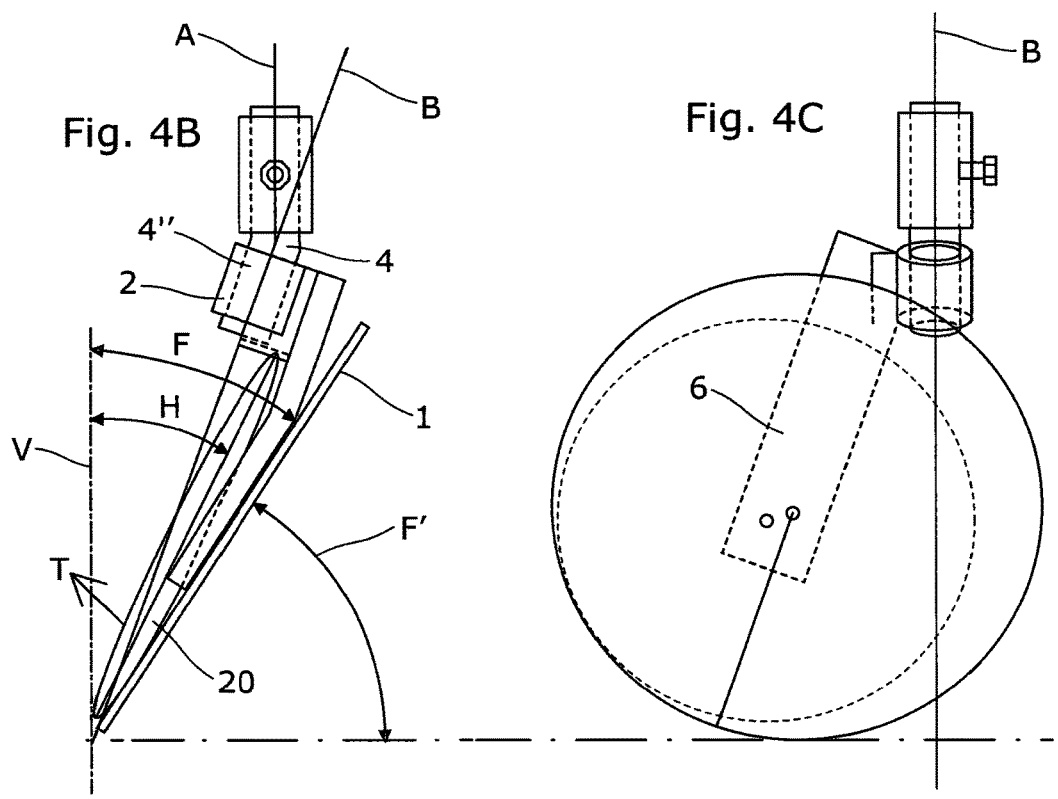

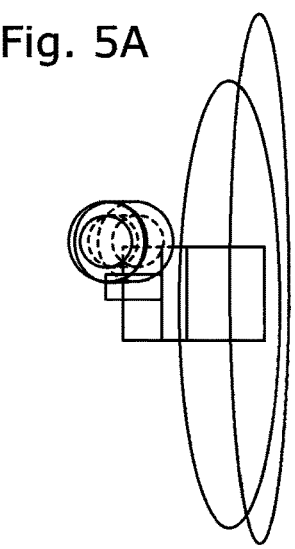
Fig. 5A
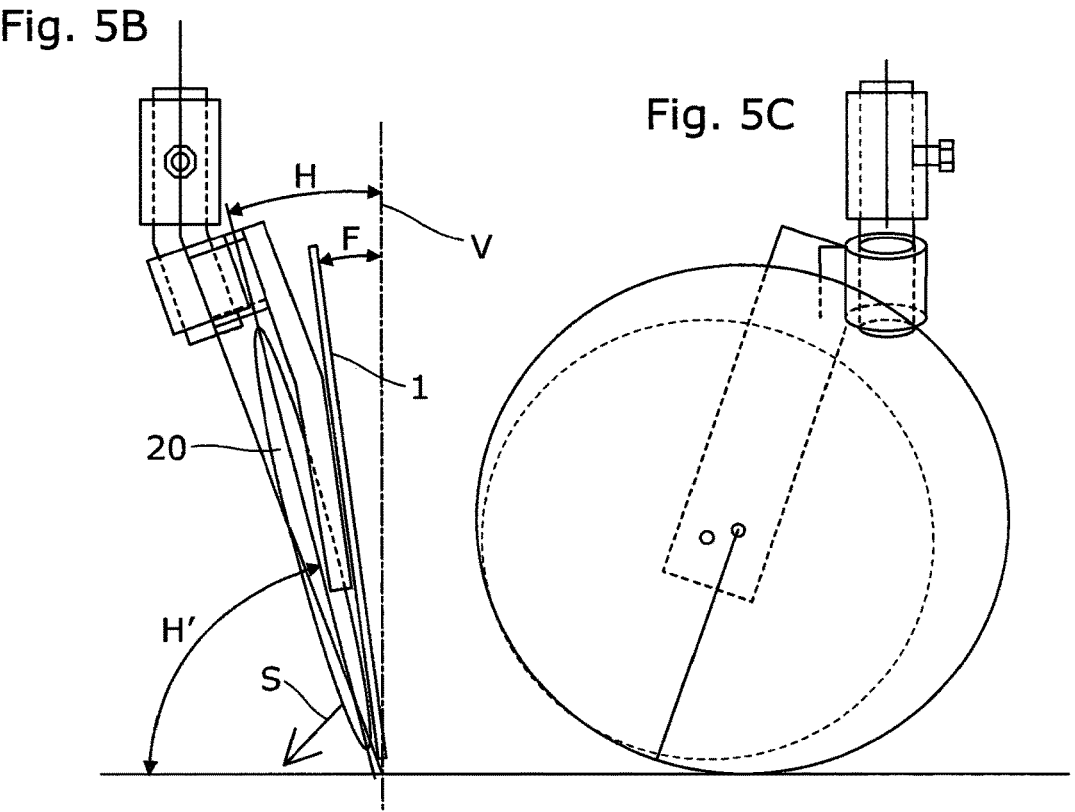
Fig. 5B
Fig. 5C

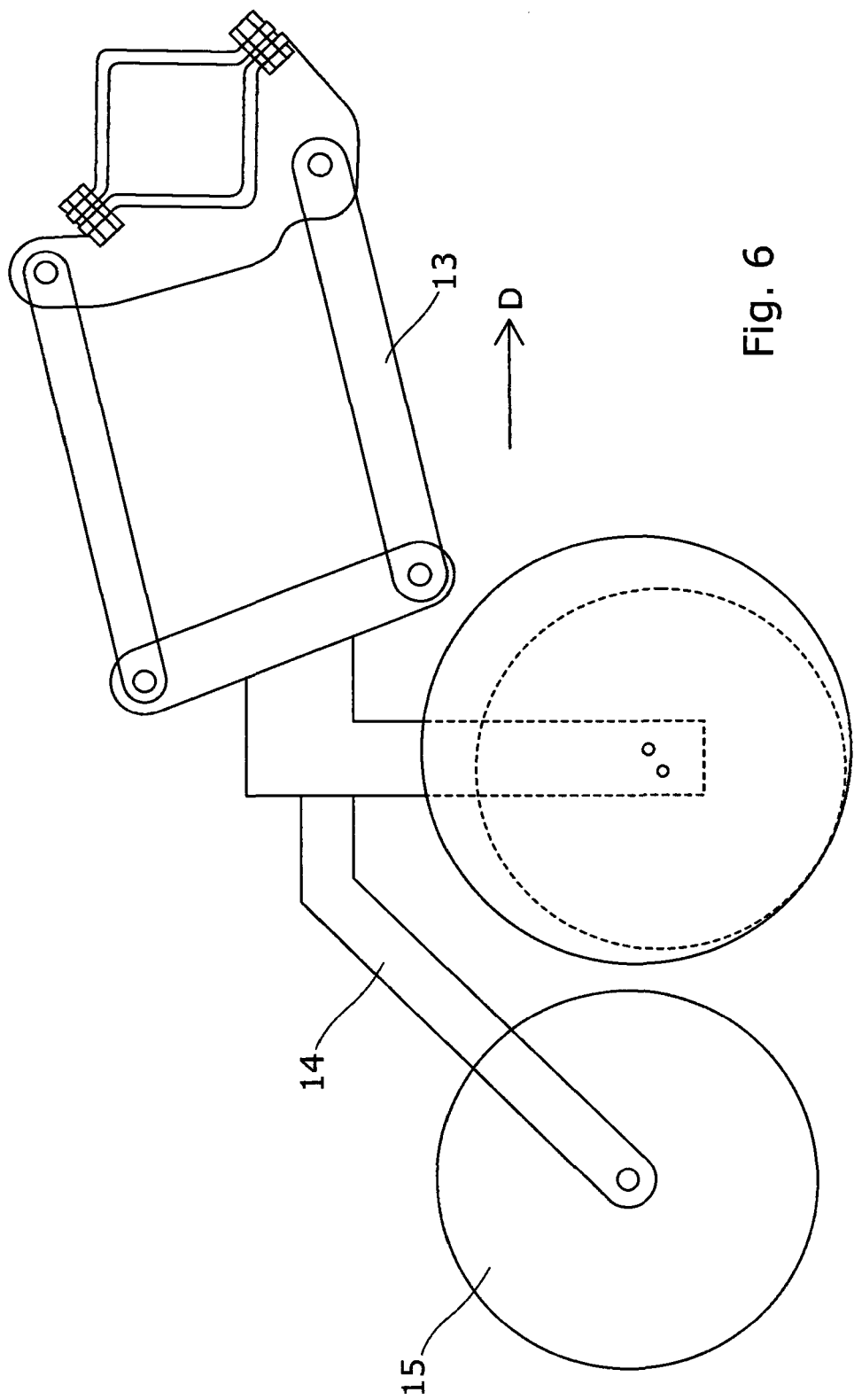

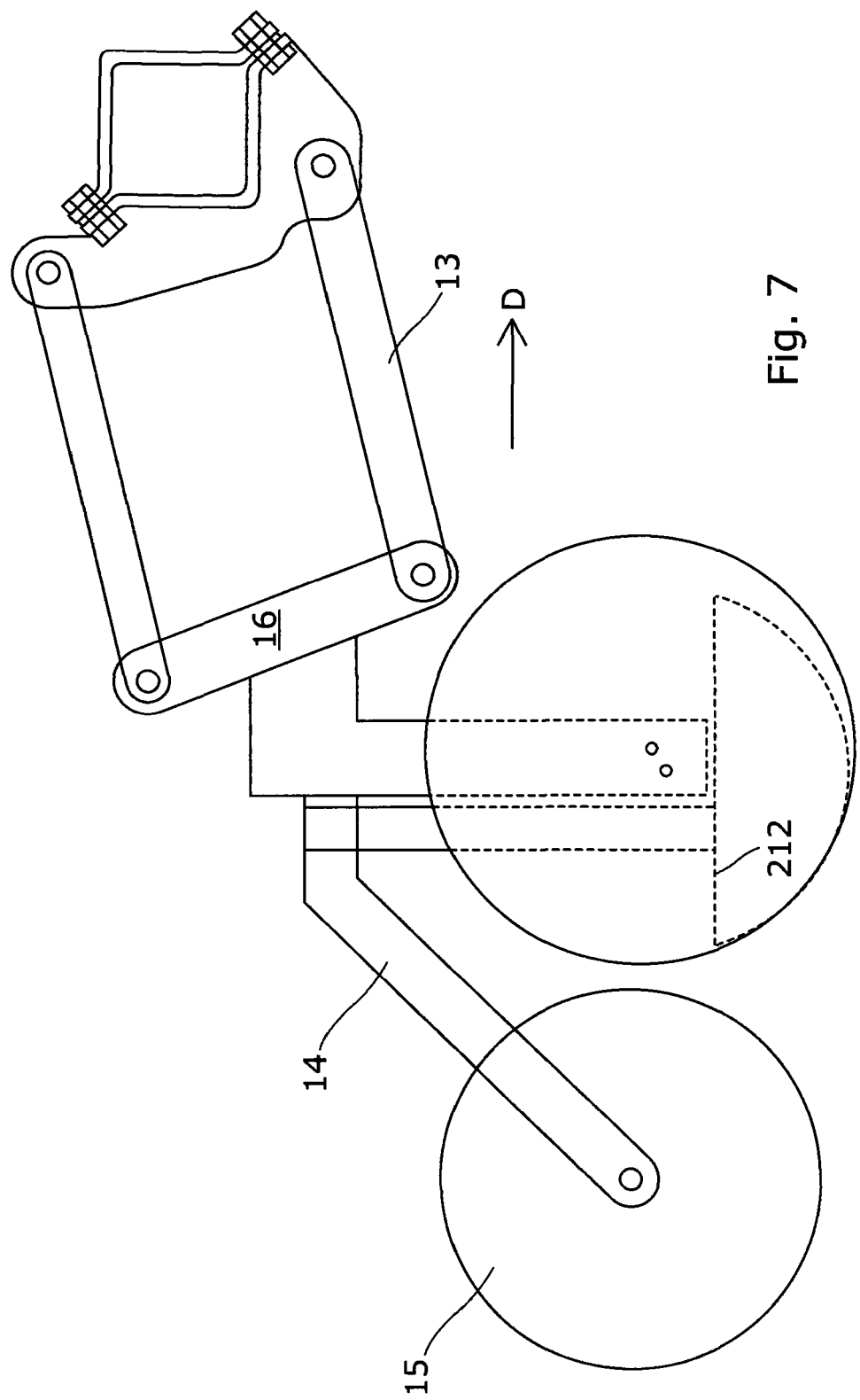

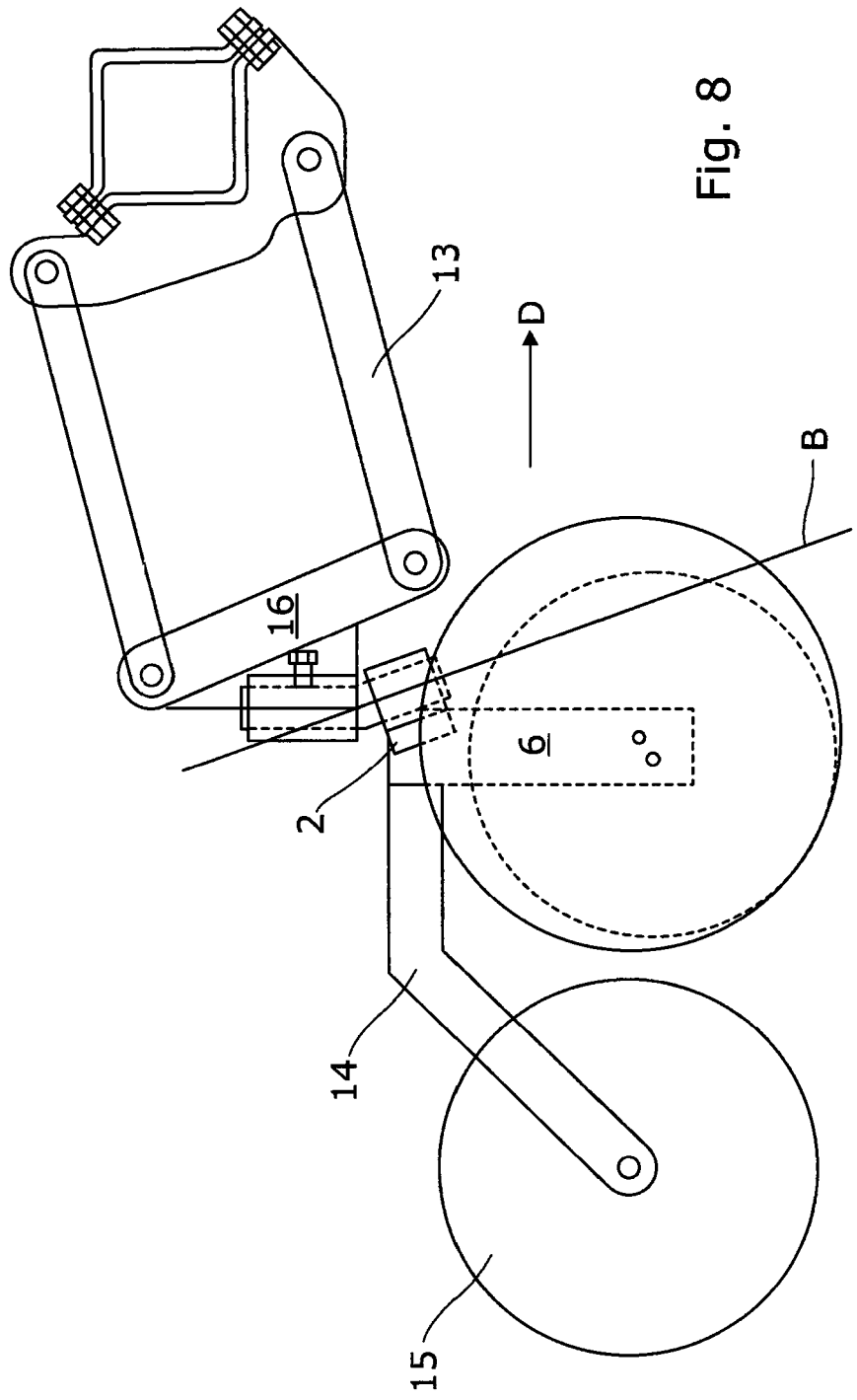

SOIL OPENER

CROSS-REFERENCE TO RELATED APPLICATIONS

This application is a national phase entry under 35 U.S.C. § 371 of International Patent Application PCT/GB2014/053341, filed Nov. 11, 2014, designating the United States of America and published in English as International Patent Publication WO 2015/071652 A1 on May 21, 2015, which claims the benefit under Article 8 of the Patent Cooperation Treaty to United Kingdom Patent Application Serial No. 1405202.1, filed Mar. 24, 2014, and to United Kingdom Patent Application Serial No. 1319935.1, filed Nov. 12, 2013.

TECHNICAL FIELD

This disclosure relates to methods and apparatus for parting soil for placing seed in the ground, also known as "soil opening."

BACKGROUND

U.S. Pat. No. 5,609,114 to Barton, hereinafter referred to as the '114 Patent, discloses a soil opening tool assembly for use with an agricultural implement intended to be moved in a specified line of travel and comprising a first generally upright rotating disc configured to penetrate into the soil to a first depth below the soil surface. The disc is set at a first horizontal angle to the line of travel to provide a leading surface and a trailing surface relative to the direction of travel. The disc is also set at a first angle to the vertical, whereby a top of the disk is inclined generally toward the trailing surface. In one particular embodiment, a disc is toed in 8° horizontally from the line of travel and leans inward 23° to the vertical. According to the '114 Patent, the combined effect of these two angles is that the soil is undercut, lifted and moved by a small amount horizontally, creating an angled furrow into which seed and/or fertilizer is dispensed. The displaced soil exerts a sideways reaction force on the disc, which is transmitted via a rigid connection to the frame of the agricultural implement. An additional disc is also disclosed that engages the soil at a point behind the first disc in the direction of travel to cut a second furrow.

U.S. Pat. No. 6,067,918 to Kirby shows a similar arrangement comprising a first generally upright rotating disc configured to penetrate into the soil to a first depth below the soil surface to create a furrow. A so-called "finger wheel" is also provided to move portions of soil displaced by the disc back over the furrow. To this end, the finger wheel does not penetrate the soil in the manner of the first disc but is, instead, pivotally attached to a frame and is free to move up and down as it rides on the ground.

Although not disclosed in U.S. Pat. No. 5,609,114 to Barton, it can, nevertheless, be advantageous to mount such a soil opening tool assembly to the agricultural implement in a castoring fashion about a pivot located ahead of the assembly in the direction of travel. Such an arrangement is believed to be used, e.g., in the "07 Series Opener" manufactured by the Great Plains Manufacturing Company of Salina, Kans., USA. FIG. 1A is a schematic plan view of such an arrangement for parting soil for placing seed in the ground level G of a field. The pivotal mounting prevents the transmission of the sideways reaction forces to the frame of the agricultural implement. Instead, first and second members 500, 600 run in the ground G at a slight angle W to either side of the direction of travel D, their respective soil-engaging surfaces 501, 601 displacing the soil slightly to cause an opening in the soil so that seed can be introduced and the corresponding sideways reaction forces substantially canceling out. FIG. 1B is a rear elevation of the apparatus of FIG. 1A viewed in the direction of travel (FIG. 1A corresponding to a view taken in the direction of arrow Z in FIG. 1B), from which can be seen that first and second members 500, 600 run at an angle U to either side of the vertical V, perpendicular to the level of the field G. However, the use of two members in this way results in significant disruption of the soil.

With a view to reducing disruption of the soil, U.S. Patent Application Publication No. US 2012/0137942 discloses a soil-opening tool assembly having two discs—a first "parting" or "spreading" disc angled to the direction of travel and to the horizontal as discussed above and a second "coulter" disc that is almost perfectly vertically oriented so as to minimize the fracturing of the soil at the row line.

This disclosure has as an objective the mitigation of problems with such known apparatus.

BRIEF SUMMARY

According to a first aspect of this disclosure, there is provided a soil opener for driving through soil in a direction of travel, the soil opener comprising:
  a leg (6) having a hinge (2, 4") configured to permit castoring of the leg (6) when driven through soil;
  first and second soil-cutting members (20, 1) mounted on the leg (6) so as to be substantially coincident in the direction of travel (D); wherein
  the first soil-cutting member (20) has a first soil-engaging surface (20") inclined:
    at a first angle (H) to a perpendicular (V) to the soil surface (G) when viewed along the direction of travel, the first angle (H) being greater than zero; and
    at a second angle (J) to the direction of travel when viewed along a perpendicular (V) to the soil surface (G), the second angle (J) being greater than zero; and wherein
  the second soil-cutting member comprises a rotating disc (1) and has a second soil-engaging surface (1") that faces away from, and in a substantially opposite direction to, the first soil-engaging surface (20"), the second soil-engaging surface (1") being inclined:
    at a third angle (F) to a perpendicular (V) to the soil surface when viewed along the direction of travel (D), the third angle (F) being greater than zero and in the same sense as the first angle (H).

In contrast to the known arrangements discussed above, the soil opener according to this disclosure has both soil-engaging members inclined to the same side of the vertical. As a consequence, soil is predominantly deflected in a sideways direction. This has been found to result in less disruption of the soil.

A particularly beneficial reduction in sideways force may be achieved where the second soil-cutting rotating disc (1) lies parallel to the direction of travel (D) when viewed along a perpendicular (V) to the soil surface (G). With certain exceptions (e.g., when the direction of travel is not straight such as when turning), a straight line between the lowermost point of the second soil-cutting rotating disc (1) and the point of intersection of an axis (B) of the leg hinge (2, 4") with a (nominally horizontal) plane parallel to the soil level and at the same level as that lowermost point will align with the direction of travel (D).

The second soil-cutting member (1) may be configured to penetrate the soil surface over a greater extent than the first soil-cutting member (20). The first soil-cutting member (20) may be a rotating disc, in which case, it may be of smaller diameter than the second soil-engaging rotating disc (1). Alternatively, the first soil-cutting member may be a stationary member blade such as a coulter (212). The first soil-engaging member (20, 212) may sit within the envelope of the second soil-engaging member (1) when viewed transversely to the direction of travel (D) and parallel to the soil surface.

The third angle (F) may be greater than the first angle (H), in particular, by about 7 degrees. The first angle (H) may lie in the range of about 5 to about 40 degrees, in particular, in the range of about 10 to about 30 degrees, most particularly, about 18 degrees. The third angle (F) may lie in the range of about 10 to about 50 degrees, in particular, in the range of about 20 to about 30 degrees, most particularly, about 25 degrees.

The first angle (H) may be greater than the third angle (F), in particular, by about 7 degrees. The first angle (H) may lie in the range about 10 to about 40 degrees, in particular, in the range of about 10 to about 20 degrees, most particularly about 10 degrees.

The first and second soil-engaging members (20, 1) may both be mounted at the lower end (6") of the leg (6), the upper end (6') of the leg (6) having the hinge (2, 4") so as to enable castoring of the first and second members (20, 1) about the first hinge axis (B).

This first hinge axis (B) may be rotatable relative to a second axis (A), inclined to the first axis (B), so as to vary one or more of the angles of the soil-cutting members. In particular, the soil opener may comprise a shaft (4) having mutually inclined first and second portions (4", 4'), the second portion (4') being mounted for rotation relative to a chassis about the aforementioned second axis (A) and the leg (6) being mounted for hinge rotation relative to the first portion (4") about the first hinge axis (B).

The first and second axes (B, A) may be configured such that there is no variation in the soil track of the assembly in a direction transverse to the direction of travel (D) and parallel to the soil surface (G). In particular, the first and second axes (B, A) may intersect at or below the surface of the soil when viewed in the direction of travel (D) of the apparatus.

According to a second aspect of this disclosure, there is provided a soil opener for driving through soil in a direction of travel, the soil opener comprising:
a first soil-cutting member (20) having a first soil-engaging surface (20");
a second soil-cutting member comprising a rotating disc (1) having a second soil-engaging surface (1") that faces away from, and in a substantially opposite direction to, the first soil-engaging surface (20");
at least one of the first and second soil-engaging surfaces (20", 1") being inclined at a non-zero angle to a perpendicular to the soil surface when viewed in the direction of travel; and
the first and second soil-engaging members (20, 1) being mounted for castoring about an axis (B) inclined downward in the direction of travel.

In contrast to known arrangements (e.g., in which a vertical pivot is placed well forward of the ground-engaging soil openers, allowing the opener to centralize by a long trailing effect), the inclination of the castor axis downward in the direction of travel increases the stability of such castor action, reducing sideways movement. It may also reduce movement that might otherwise result from any unbalance, e.g., where different size discs are used.

In particular, the axis (B) may be inclined downward in the direction of travel at an angle (C') in the range of about 60 to 80 degrees to the soil surface (G), in particular, about 70 degrees to the soil surface.

The second aspect of the disclosure can be particularized using features of the first aspect and vice versa.

BRIEF DESCRIPTION OF THE DRAWINGS

An embodiment of the disclosure will now be described by way of example with reference to the accompanying drawings, in which:

FIGS. 3A-3C are detail plan, rear and side views of the embodiment of FIG. 2;

FIGS. 4A-4C are detail plan, rear and side views of the embodiment of FIG. 2 after adjustment;

FIGS. 5A-5C are detail plan, rear and side views of the embodiment of FIG. 2 after further adjustment;

FIG. 6 is a side view of a second embodiment of the disclosure;

FIG. 7 is a side view of a third embodiment of the disclosure;

FIG. 8 is a side view of a fourth embodiment of the disclosure;

DETAILED DESCRIPTION

Figure 1A:
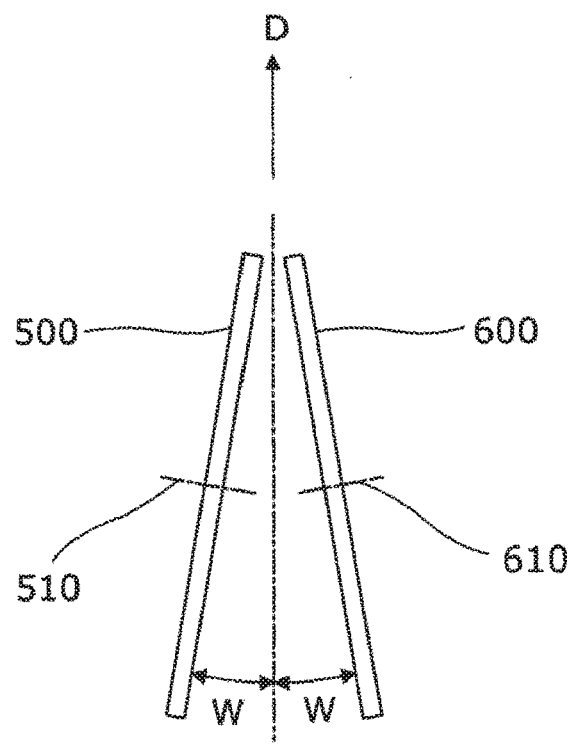
FIG. 1A is a schematic plan view of a prior art arrangement for parting soil for placing seed in the ground level of a field.
Figure 1B:
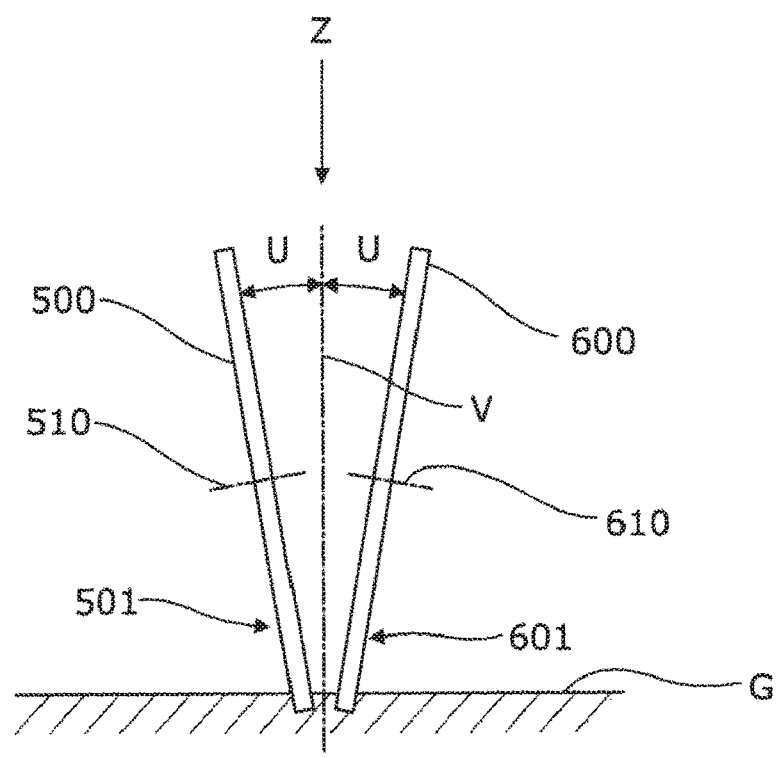
FIG. 1B is a rear elevation of the apparatus of FIG. 1A viewed in the direction of travel, perpendicular to the ground level of the field.
Figure 2:
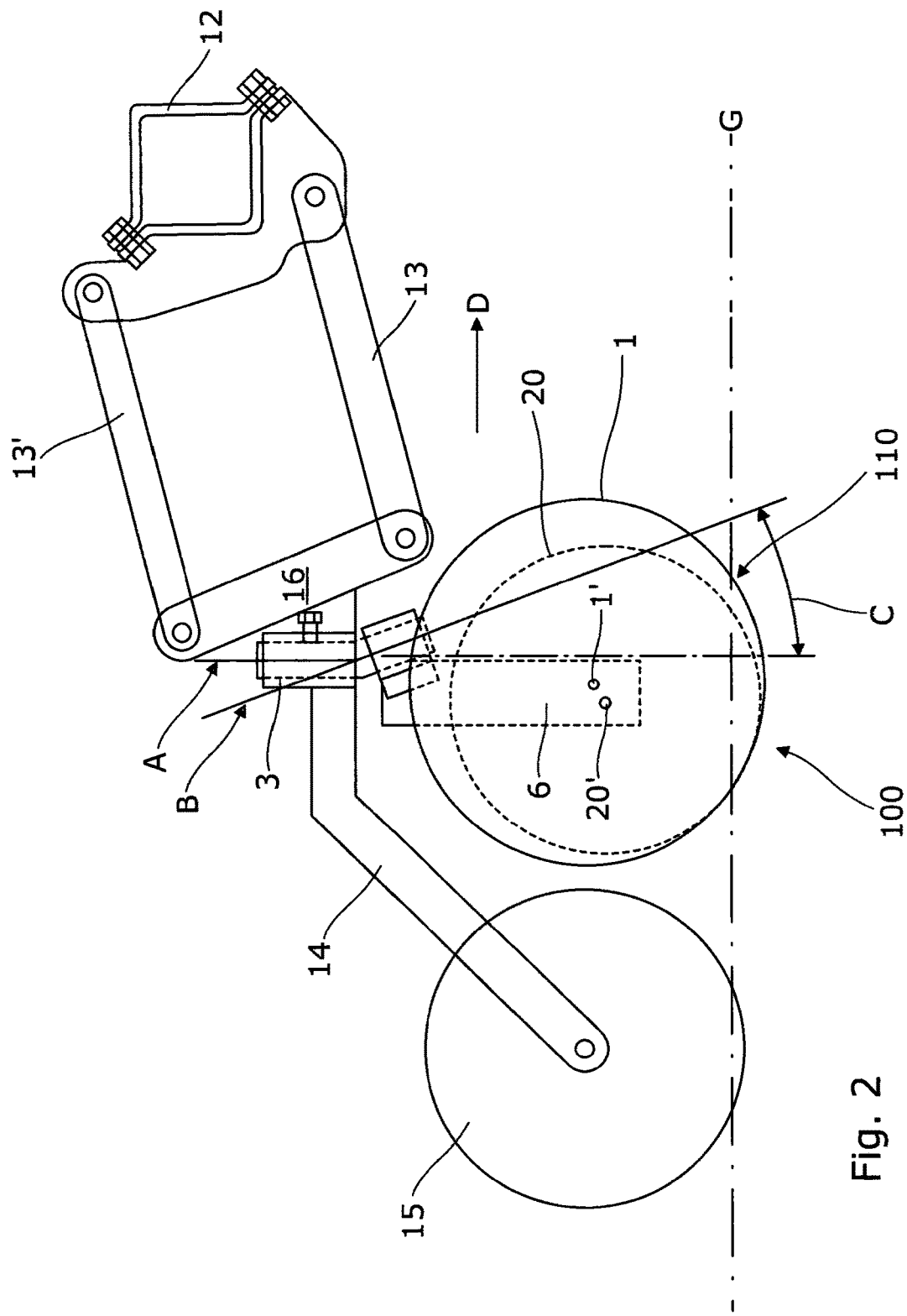
FIG. 2 is a side view of a first embodiment of the disclosure.

Referring to FIG. 2, a soil opener assembly 100 is driven, typically towed, through a field in a direction of travel D by the cross-beam 12 of a seed drill via a parallel linkage arrangement comprising upper and lower trailing arms 13', 13, each articulated at one end to the cross-beam 12 and at the other end to a carrier 16 in a manner known per se. A wheel 15 is mounted on arm 14, which is rigidly connected to bush 3, which, in turn, is rigidly connected to the carrier 16. In an alternative embodiment, not shown, the parallel arms are replaced by a single arm pivoted at one end to the cross-beam 12 and rigidly attached at the other end to carrier 16 or bush 3.

By means of bush 3, carrier 16 hingedly/pivotally supports a leg 6 carrying separate primary and secondary soil-cutting, independently rotatable discs 1 and 20 at its lower end, the terms "primary" and "secondary" referring to the relative diameters of the discs and not to be confused with the terminology of the claims. The discs are inclined relative to one another such that the gap between primary and secondary discs at a point below and ahead of wheel axes 1', 20' is smaller than the gap at a point behind and above wheel axes 1', 20'. This latter, greater gap allows seed to be introduced between the discs as is known per se. Arm 14 is provided with means—known, per se, and consequently not shown—to allow adjustment of the level of the wheel 15 relative to the discs 1, 20, thereby adjusting the depth to which the soil opener penetrates the ground. With certain exceptions (e.g., when the direction of travel is not straight such as when turning), a straight line between the lowermost point of the second soil-cutting rotating disc (1) and the point of intersection of an axis (B) of the leg hinge (2, 4") with a (nominally horizontal) plane parallel to the soil level and at the same level as that lowermost point will align with the direction of travel (D).

FIGS. 3A, 3B and 3C show soil opener assembly 100 from the top (i.e., in a direction V perpendicular to the soil surface G), from the rear in the direction of travel D and from the side (i.e., in a direction parallel to the soil surface G and perpendicular to the direction of travel D), respectively, the views being arranged in third angle projection. A shaft 4 has an upper portion 4' that is held in the bush 3 and is prevented from rotation therein by a releasable set stud or bolt 8. The upper portion 4' of the shaft 4 extends along an axis A oriented substantially vertically, i.e., substantially perpendicular to the surface of the ground G as shown in FIG. 2.

The lower portion 4" of shaft 4 extends along an axis B that is inclined to axis A in the direction of travel D by an angle C of approximately 20 degrees, possibly as low as 10 degrees, and hereafter referred to as the "castor angle." In other words, axis B is angled downward in the direction of travel at the complementary angle C' to the horizontal/ground G. A value of C' of approximately 70 degrees has been found to be particularly advantageous, although advantageous operation may also be achieved in a range from about 60 degrees to about 80 degrees.

Leg 6 has an upper portion 6' hingedly/pivotally attached to the lower portion 4" of the shaft 4 by a sleeve or bush 2 for rotation about axis B, the lower portion 6" of the leg carrying the primary and secondary rotating discs 1 and 20. Upper leg portion 6' is aligned substantially perpendicular to the ground G, while lower leg portion 6" is inclined at an angle E in the range of approximately 15 to approximately 40 degrees to the vertical V as seen in FIG. 3B.

As shown in FIG. 3B, the discs are attached on either side of the leg as viewed in FIG. 3B, i.e., spaced in a direction parallel to the ground and perpendicular to the direction of travel D but coincident in the direction of travel, i.e., each configured to simultaneously penetrate the soil at substantially the same point, and to substantially the same depth below the soil surface. (Although the edge-on view of disc 1 in FIG. 3B appears as a line, it will be appreciated that both discs have significant thickness.) The location of discs 1, 20 and their respective axes 1', 20' behind the axis B results in a castor action around axis B as is known, per se.

Primary disc 1 is attached to one side of lower leg portion 6" and, in the embodiment shown, is inclined at a primary "camber" angle F to the vertical V but with its axis of rotation 1' perpendicular to the direction of travel D. An angle F of 25 degrees has been found to be most advantageous; however, operation with an angle F in the range of about 20 to about 30 degrees can still be particularly advantageous, with operation with an angle F in the range of about 10 to about 50 degrees being advantageous. Choice of angle may depend on soil conditions, as discussed below.

Secondary disc 20 is fixed to the opposite side of the lower leg portion 6" and is inclined at a secondary "camber" angle H, greater than zero, to the vertical V and at a "toe" angle J to the direction of travel. As a result, the primary and secondary discs are inclined relative to one another by an angle K in the range of from 5 degrees to 10 degrees, typically 7 degrees in the embodiment shown. Angle H may lie in the range of about 5 degrees to about 40 degrees, in particular, in the range of about 10 degrees to about 30 degrees, most particularly about 18 degrees.

While soil engagement is predominantly by those outward-facing surfaces 1", 20" of the discs 1, 20 that face away from, and in substantially opposite directions of surfaces 1'", 20'" to, one another, the discs in the embodiments described are thin and the angles of inclination of those surfaces are taken to correspond to angles of inclination of the discs themselves. As a result of these various inclinations, the gap between primary and secondary discs is smallest at a point 9 below and ahead of wheel axes 1', 20' and greatest at a point 10 behind and above of wheel axes 1', 20'. This gap at point 10 is to allow seed to be introduced between the discs and is typically between 25 and 50 mm.

Primary disc 1 having an axis of rotation perpendicular to the direction of travel provides a stabilizing effect that counters the transverse forces generated by the secondary disc 20.

In the embodiment shown, primary disc 1 also has a larger diameter than the secondary disc 20. As such, primary disc 1 not only engages the ground at a point 110 (see FIG. 2) ahead of the secondary disc 20, it also cuts more deeply into the soil than secondary disc 20. Consequently, primary disc 1 plays a dominant role in the castor action. When viewed transversely to the direction of travel (D) and parallel to the soil surface as in FIG. 3C, secondary disc 20 also sits within the envelope, i.e., circumference, of the primary disc 1.

Moreover, in contrast to known arrangements (e.g., in which a vertical pivot is placed well forward of the ground-engaging soil openers, allowing the opener to centralize by a long-trailing effect), the inclination of axis B downward in the direction of travel D increases the stability of such castor action, reducing sideways movement. It may also reduce movement that might otherwise result from any unbalance, e.g., where different size discs are used.

In addition, and in contrast to the known arrangements discussed above and in which primary and secondary discs are inclined to either side of the vertical, the inclination of the primary and secondary discs is to the same side of the vertical. As a consequence, soil is predominantly deflected in a sideways direction toward the vertical axis V rather than in two, opposing sideways directions. This has been found to result in less disruption of the soil.

By releasing the set stud 8, the upper portion 4' of shaft 4 can be rotated in bush 3 relative to carrier 16 before being locked again by tightening the set stud. FIGS. 4A-4C show the arrangement of FIGS. 3A-3C after rotation of the shaft 4 through 90 degrees, such that axis B points to one side of, i.e., transversely to, the direction of travel D. Sleeve 2 can rotate freely on the lower portion 4" of shaft 4 such that leg 6 again assumes a trailing position under castor action. However, as a result of the inclination of the rod in the transverse direction—as shown in FIG. 4C—the inclination of the leg 6 and, thus, the camber F, H of primary and secondary discs 1, 20 is increased significantly.

It has been found that increasing the inclination of the primary and secondary discs to the vertical V causes the secondary disc 20, in particular, to direct its soil displacement in an upward direction, as indicated by arrow T. This has been found to be advantageous in hard soil conditions, reducing pressure damage to the soil in the creation of the opening for the seed. It also has the benefit of reducing side forces on the components of the machine, pressure needed to force openers into the soil and draft force needed to pull openers through the soil.

Rotating shaft 4 through 90 degrees in the opposite direction to that illustrated in FIGS. 4A-4C causes the primary and secondary discs 1, 20 to camber in the opposite sense, such that angle H becomes greater than angle F and complementary angle H' relative to the soil G decreases, as shown in FIGS. 5A-5C. This has been found to cause the secondary disc 20 to direct its soil displacement in a downward direction as indicated by arrow S, which, in turn, has been found to be advantageous in soft soil conditions. In the embodiment shown, angle H' is about 80 degrees, corresponding to an inclination H to the vertical V of 10 degrees. Where the primary and secondary discs are inclined relative to one another by an angle of approximately 7 degrees, this corresponds to an inclination F of the primary disc 1 to the vertical V of 3 degrees. However, particularly advantageous operation may be achieved with H in the range of about 10 to about 20 degrees and advantageous operation may be achieved with H in the range of about 10 degrees to about 40 degrees.

It will be appreciated that shaft or rod 4 can be oriented at other angles between those illustrated in FIGS. 4A-4C and 5A-5C as long as the first and second soil-engaging surfaces remain inclined at a non-zero angle to the vertical.

FIG. 6 is a side view of a soil opener similar to that of FIG. 2 but without a rotatable shaft 4 allowing adjustment of disc inclination; instead, the primary and secondary discs 1 and 20 are fixed at any one of the advantageous inclinations as set out above to leg 6 that, in turn, is fixed directly to carrier 16.

FIG. 7 is a side view of a soil opener similar to that of FIG. 2 but with the rotatable secondary disc 20 replaced by a fixed coulter 212 inclined at an advantageous angle as set out above.

Referring back to FIG. 2, typically, each individual seeding unit works in conjunction with a wheel or wheels 15 that follows the track of the soil opener assembly 100 through the soil, closing the opening so as to cover the seed in the soil. The wheel or wheels 15 also control the depth the opener 100 penetrates the soil, thus controlling the depth the seed is placed in the soil. As shown in FIG. 2, wheel 15 and wheel bracket 14 can be simply directly attached to bush 3 or linkage bracket 16, thereby causing the wheel to take a fixed tack behind the varying tack of the discs 1, 20 rotating around axis B.

Alternatively, as shown in FIG. 8, wheel 15 and wheel bracket 14 can be directly attached to sleeve 2/leg 6, thereby causing the wheel track to rotate around axis B with the discs 1, 20 in a direction determined by the primary disc 1.

Figure 9A:
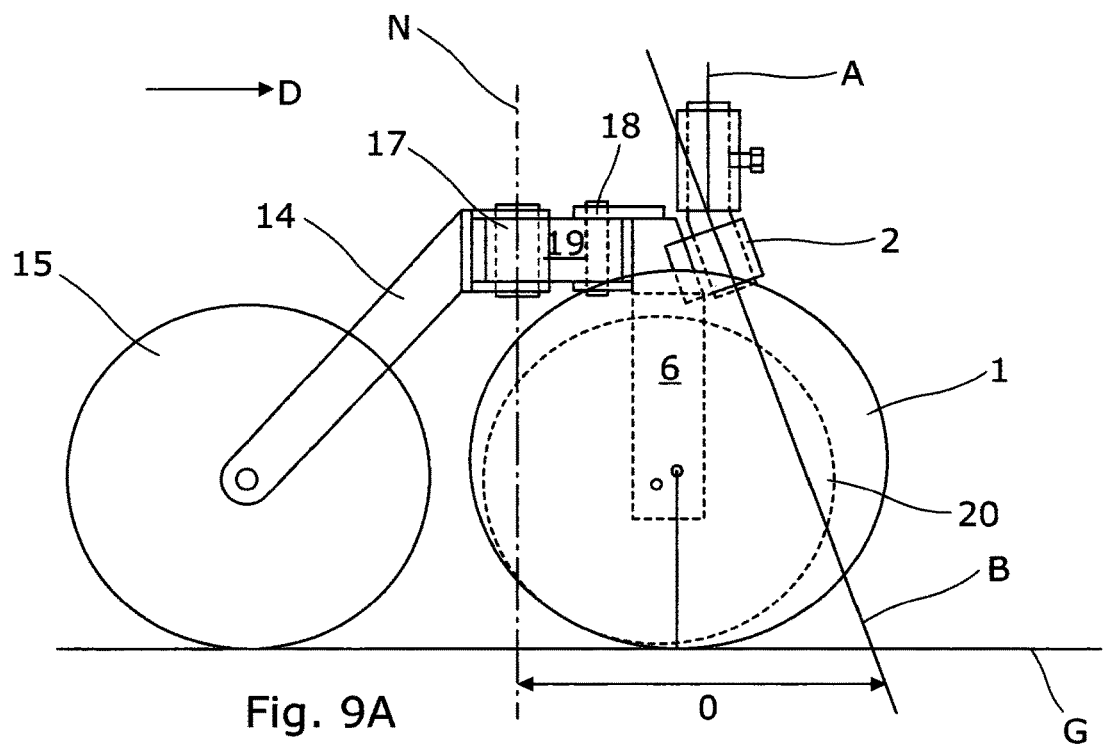
FIGS. 9A-9G are side and plan views of a fifth embodiment of the disclosure.

In another embodiment shown in FIG. 9A, wheel 15 and wheel bracket 14 are attached to sleeve 2 and leg 6 by means of a first vertical pivot 17 having axis N. As shown, the first pivot 17 is located at one end of a first interlink 19 that is attached at its other end to the leg 6 by means of a second vertical pivot 18.

Figure 9B:
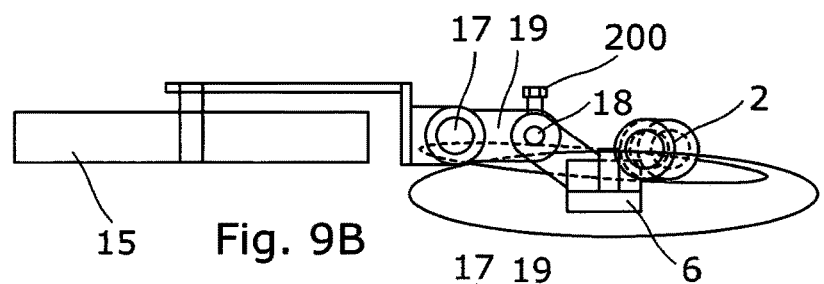
Figure 9C:
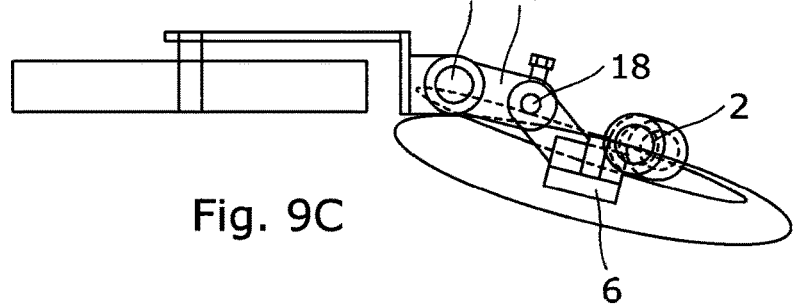
Figure 9D:
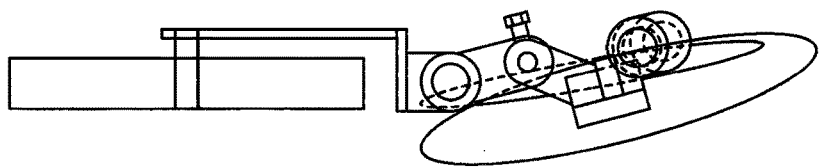

As shown in the plan views of FIGS. 9B to 9D, the second pivot 18 can be locked by means of a stud or set screw 200, allowing the wheel to castor track relative to the soil opening, which, in turn, is substantially determined by primary disc 1 as discussed above. Pivot axis N is offset behind axis B by a distance O, such that it lies approximately above the trailing part of the primary and secondary discs 1 and 20. This offset causes the wheel 15 to take a track consistently relative to the soil opening made by the primary and secondary discs 1, 20.

Figure 9E:
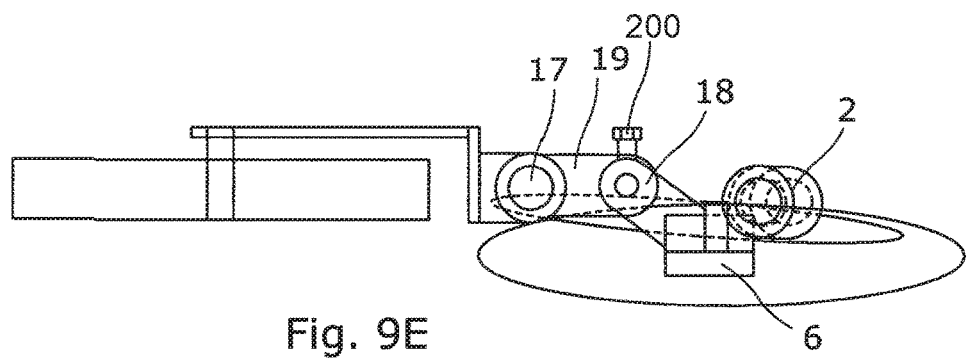
Figure 9F:
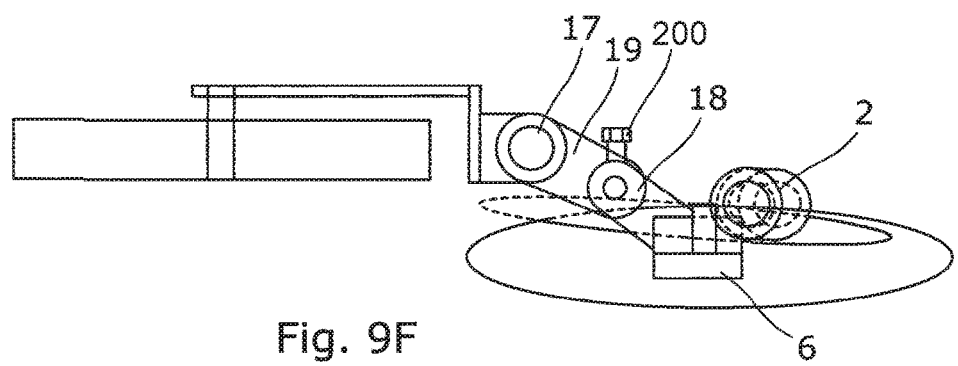
Figure 9G:
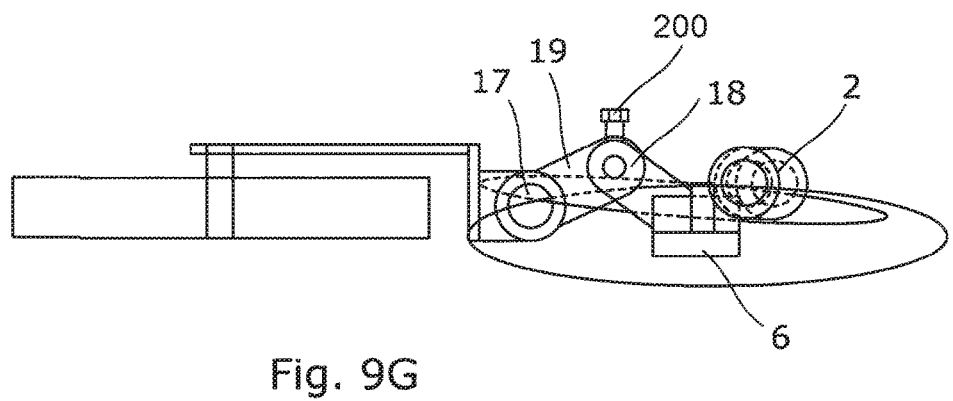

Releasing screw 200 allows the first interlink 19 to be rotated in a horizontal plane to reposition pivot 17 sideways relative to bush 2/leg 6, following which, screw 200 is again tightened, locking the second pivot 18. This allows the position of wheel 15 relative to the soil opening to be adjusted in a direction transverse to the direction of travel D, as variously illustrated in FIGS. 9E to 9G.

Figure 10A:
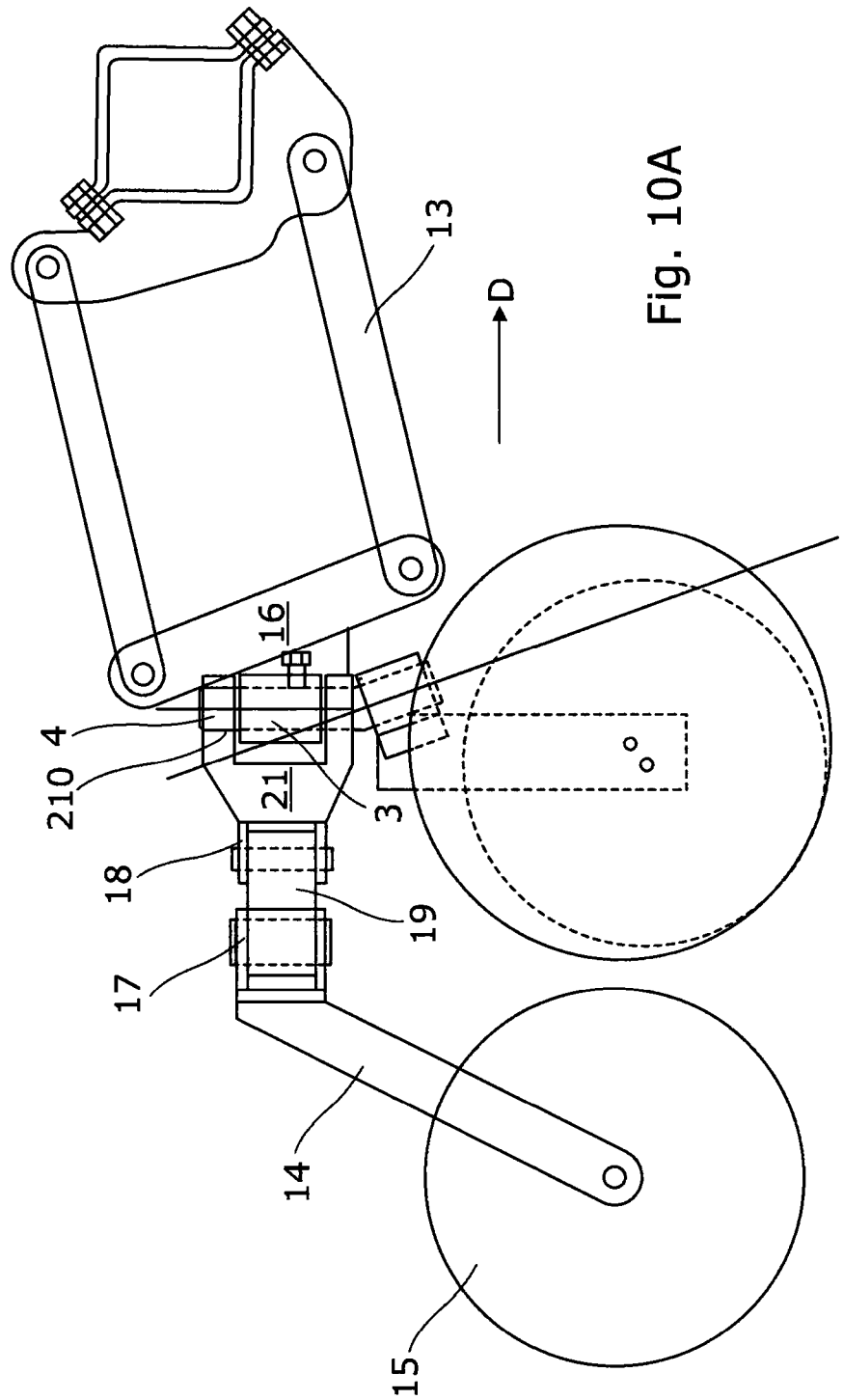
FIGS. 10A-10G are side and plan views of a sixth embodiment of the disclosure.
Figure 10B:
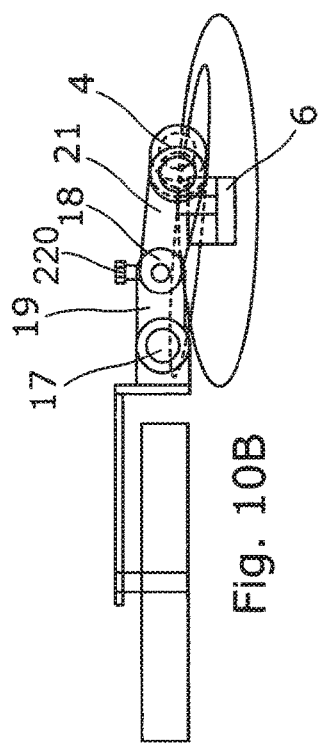
Figure 10C:
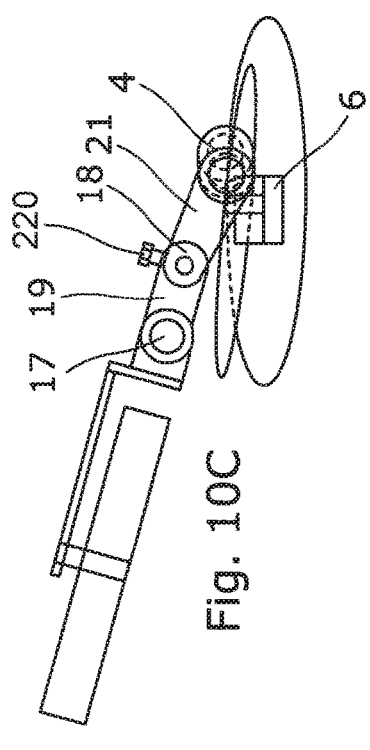
Figure 10D:
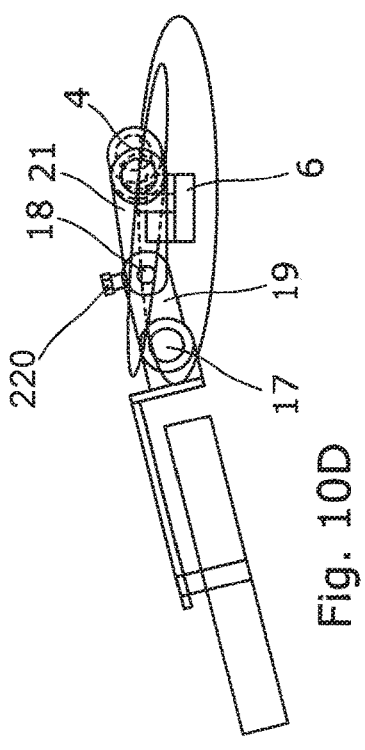
Figure 10E:
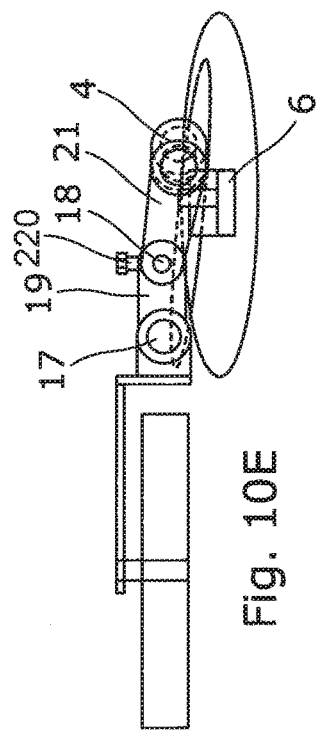
Figure 10F:
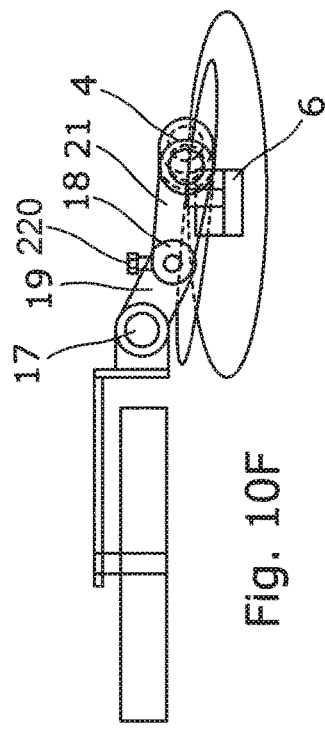
Figure 10G:
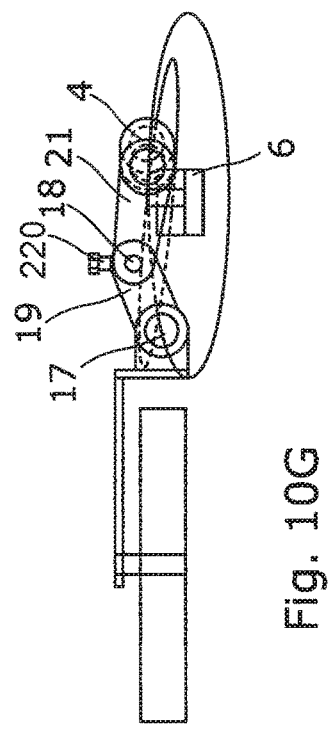

FIG. 10A shows a further embodiment in which the first interlink 19 is pivoted not to the leg 6 but rather to the carrier 16 via a second interlink 21 and third pivot 210, lockable by means of a further set screw 220. FIGS. 10B-10G are plan views showing various possible positions of the apparatus.

FIGS. 11A-13C illustrate a further development of the arrangement of FIGS. 3A-5C. In the latter arrangement, the track of each assembly 100, i.e., the intersection of the discs 1, 20 with the surface of the ground G, varies relative to axis A in a direction transverse to the direction of travel D as the shaft 4 is rotated in bush 3.

Figure 11A:
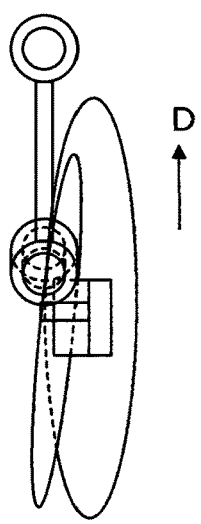
FIGS. 11A-11C, 12A-12C, and 13A-13C illustrate a further development of the embodiment of FIGS. 3A-5C.
Figure 11B:
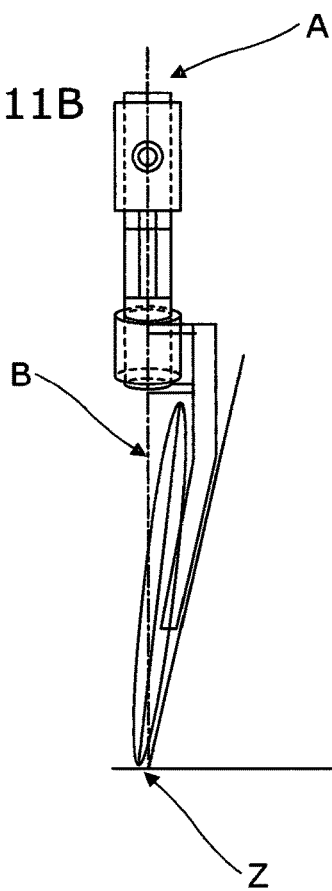
Figure 11C:
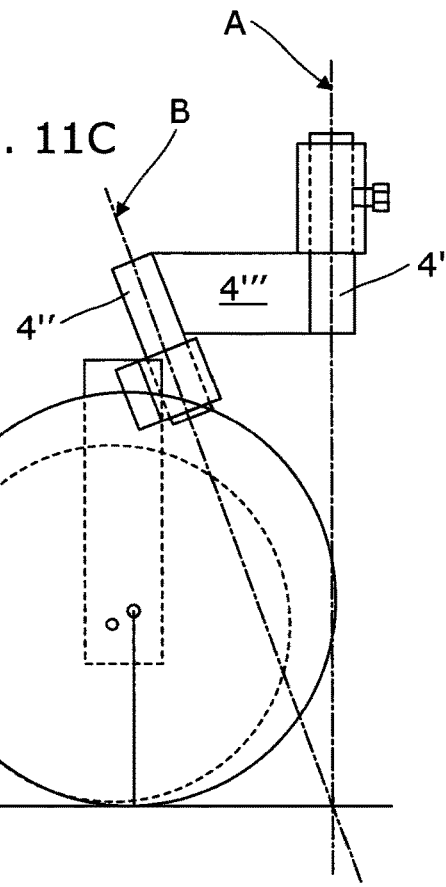
Figure 12A:
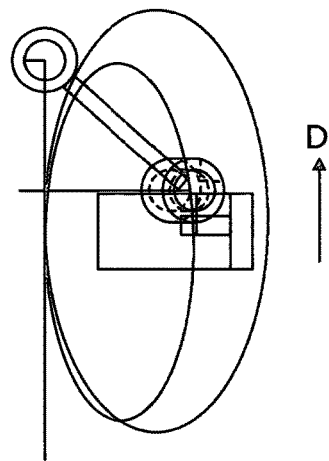
Figure 12B:
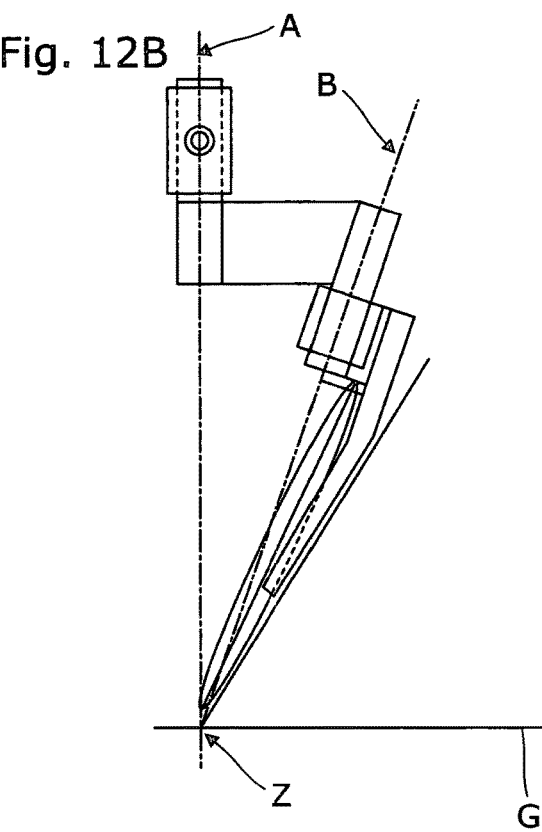
Figure 12C:
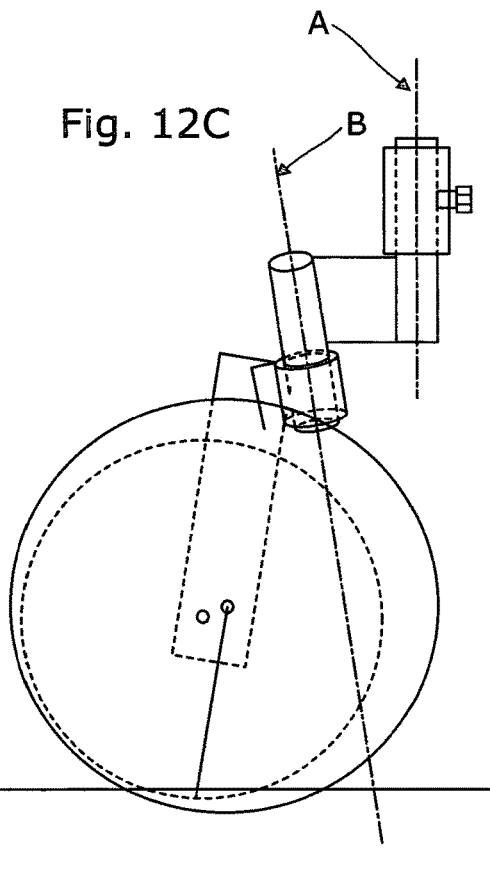
Figure 13A:
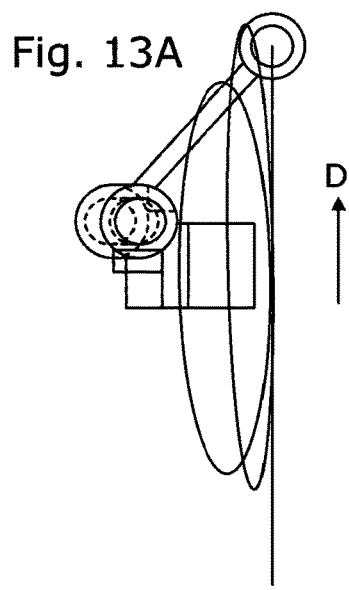
Figure 13B:
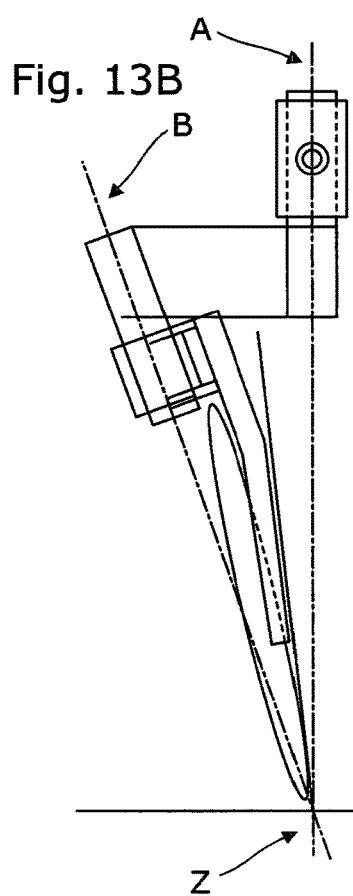
Figure 13C:
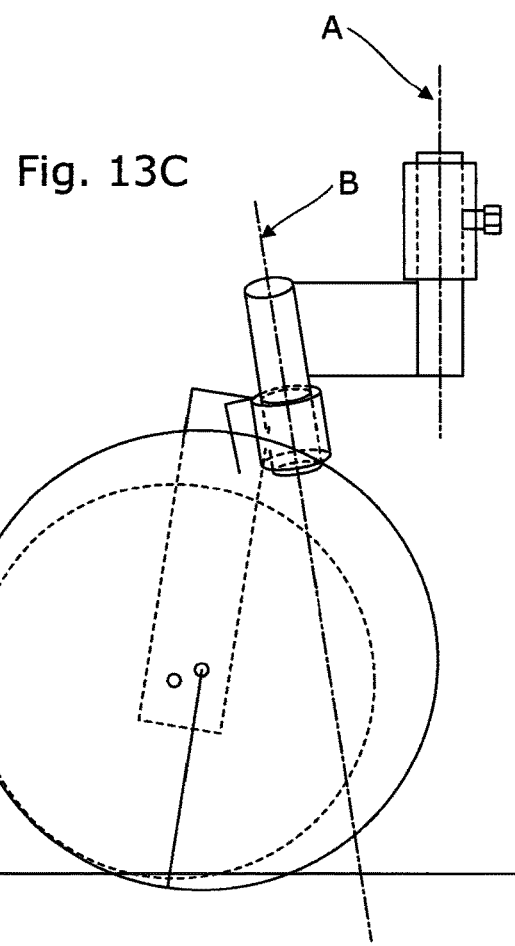

To avoid such variation, axes A and B are arranged to intersect at the surface G of the soil when viewed in the direction of travel as indicated by arrow Z in FIGS. 11B, 12B and 13B. This is achieved by configuring shaft 4, such that the first and second portions 4' and 4" are separated or offset by an intermediate shaft portion or arm 4'''. As shown, this intermediate shaft portion 4''' extends transversely to axis A.

It should be understood that this disclosure has been described by way of examples only and that a wide variety of modifications can be made without departing from the scope of the disclosure. For example, although all embodiments shown employ a pivotal hinge employing a shaft supported in a bearing, it will be appreciated that the necessary hinge motion may also be achieved by means of flexure.

The invention claimed is:

1. A soil opener for driving through soil in a direction of travel, the soil opener comprising:
   a leg; and
   first and second soil-cutting members mounted on the leg; wherein:
      the first soil-cutting member has a first soil-engaging surface inclined at a first angle to a perpendicular to the soil surface when viewed along the direction of travel, the first angle being greater than zero; and
      the second soil-cutting member comprises a rotating disc and has a second soil-engaging surface that faces away from, and in a substantially opposite direction to, the first soil-engaging surface;
   wherein:
      both the first and second soil-cutting members are inclined to the same side of a perpendicular to the soil surface, wherein the second soil-cutting rotating disc lies parallel to the direction of travel when viewed along a perpendicular to the soil surface when viewed along the direction of travel and with the second soil-engaging surface being inclined at a third angle to a perpendicular to the soil surface when viewed along the direction of travel, the third angle being greater than zero and in the same direction as the first angle; and
   wherein the first soil-engaging surface is additionally inclined at a second angle to the direction of travel when viewed along a perpendicular to the soil surface, the second angle being greater than zero, whereby the first and second soil-cutting members are mounted on the leg so as to be substantially coincident in the direction of travel.

2. The soil opener according to claim 1, wherein the first and second soil-cutting members are configured to simultaneously penetrate the soil at substantially the same point, and to substantially the same depth below the soil surface.

3. The soil opener according to claim 1, wherein the second soil-cutting member is configured to penetrate the soil surface over a greater extent along the direction of travel than the first soil-cutting member.

4. The soil opener according to claim 1, wherein the first soil-cutting member is a rotating disc.

5. The soil opener according to claim 4, wherein the first soil-cutting member is a rotating disc of smaller diameter than the second soil-cutting rotating disc.

6. The soil opener according to claim 1, wherein the first soil-cutting member is a stationary blade.

7. The soil opener according to claim 1, wherein the first soil-cutting member sits within the circumference of the second soil-cutting member when viewed transversely to the direction of travel and parallel to the soil surface.

8. The soil opener according to claim 1, wherein the third angle is greater than the first angle.

9. The soil opener according to claim 8, wherein the third angle is greater than the first angle by about 7 degrees.

10. The soil opener according to claim 8, wherein the first angle lies in the range of about 5 to about 40 degrees.

11. The soil opener according to claim 8, wherein the third angle lies in the range of about 10 to about 50 degrees.

12. The soil opener according to claim 1, wherein the first angle is greater than the third angle.

13. The soil opener according to claim 12, wherein the first angle is greater than the third angle by about 7 degrees.

14. The soil opener according to claim 12, wherein the first angle lies in the range of about 10 to about 40 degrees.

15. The soil opener according to claim 1, wherein the first and second soil-engaging members are both mounted at a lower end of the leg, an upper end of the leg having a hinge so as to enable castoring of the first and second members about a first axis of the hinge.

16. The soil opener according to claim 15, wherein the first axis of the hinge is rotatable relative to a second axis inclined to the first axis, so as to vary one or more of the angles of the first and second soil-cutting members.

17. The soil opener according to claim 16, wherein the soil opener comprises a shaft having mutually inclined first and second portions, the second portion being mounted for rotation relative to a chassis about the second axis and the leg being mounted for hinge rotation relative to the first portion about the first hinge axis.

18. The soil opener according to claim 16, wherein the first and second axes are configured such that there is no variation in soil tracking of the assembly in a direction transverse to the direction of travel and parallel to the soil surface.

19. The soil opener according to claim 18, wherein the first and second axes intersect at or below the surface of the soil when viewed in the direction of travel of the apparatus.

20. A soil opener for driving through soil in a direction of travel, the soil opener comprising:
   a first soil-cutting member having a first soil-engaging surface;
   a second soil-cutting member comprising a rotating disc having a second soil-engaging surface that faces away from, and in a substantially opposite direction to, the first soil-engaging surface; and
   at least one of the first and second soil-engaging surfaces being inclined at a non-zero angle to a perpendicular to the soil surface when viewed in the direction of travel;
   characterized in that the first and second soil-engaging members are mounted for castoring about an axis inclined downward in the direction of travel.

21. The soil opener according to claim 20, wherein the axis is inclined downward in the direction of travel at an angle in the range of about 60 to 80 degrees to the soil surface.

22. The soil opener according to claim 20, wherein the second soil-cutting rotating disc lies parallel to the direction of travel when viewed along a perpendicular to the soil surface.

23. The soil opener according to claim 20, wherein the second soil-cutting member is configured to penetrate the soil surface over a greater extent along the direction of travel than the first soil-cutting member.

24. The soil opener according to claim 20, wherein the first soil-cutting member is a rotating disc.

25. The soil opener according to claim 24, wherein the first soil-cutting member is a rotating disc of smaller diameter than the second soil-engaging rotating disc.

26. The soil opener according to claim 20, wherein the first soil-cutting member is a stationary blade.

27. The soil opener according to claim 20, wherein the first soil-engaging member sits within the circumference of the second soil-engaging member when viewed transversely to the direction of travel and parallel to the soil surface.

* * * * *

UNITED STATES PATENT AND TRADEMARK OFFICE
CERTIFICATE OF CORRECTION

PATENT NO. : 10,159,174 B2
APPLICATION NO. : 15/029932
DATED : December 25, 2018
INVENTOR(S) : Anthony Gent Page 1 of 1

It is certified that error appears in the above-identified patent and that said Letters Patent is hereby corrected as shown below:

In the Claims

| | | | |
|---|---|---|---|
| Claim 1, | Column 8, | Line 50, | change "soil surface, wherein" to --soil surface when viewed along the direction of travel, wherein-- |
| Claim 1, | Column 8, | Lines 53,54 | change "when viewed along the direction of travel and with the second" to --and with the second-- |

Signed and Sealed this
Nineteenth Day of February, 2019

Andrei Iancu
*Director of the United States Patent and Trademark Office*